E. F. WILLIAMS, DEC'D.
E. WILLIAMS, EXECUTRIX.
PISTON PACKING.
APPLICATION FILED APR. 30, 1914.
1,166,644.
Patented Jan. 4, 1916.
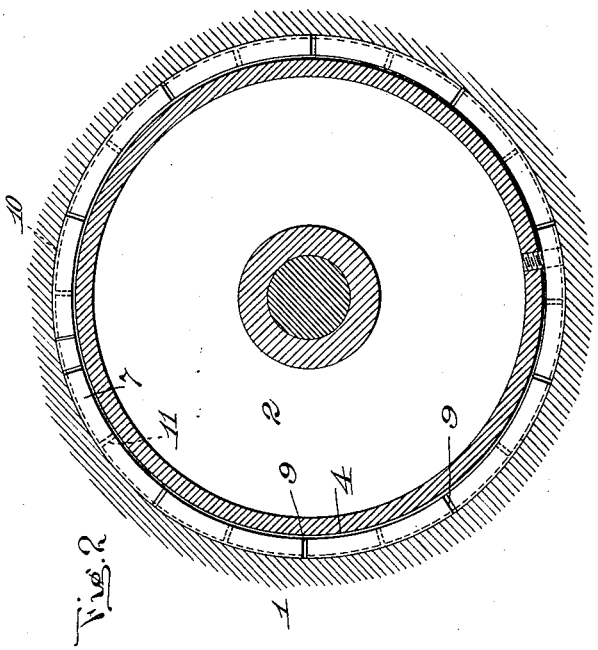
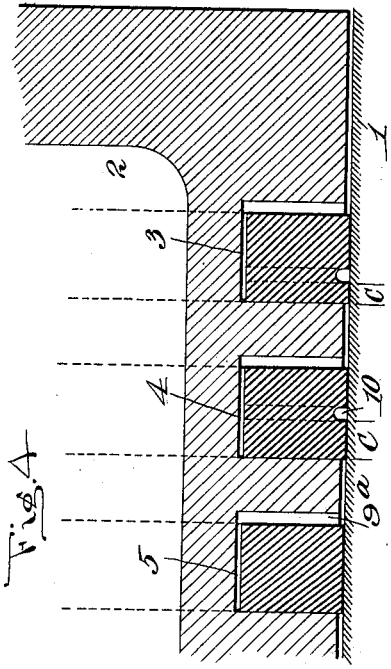
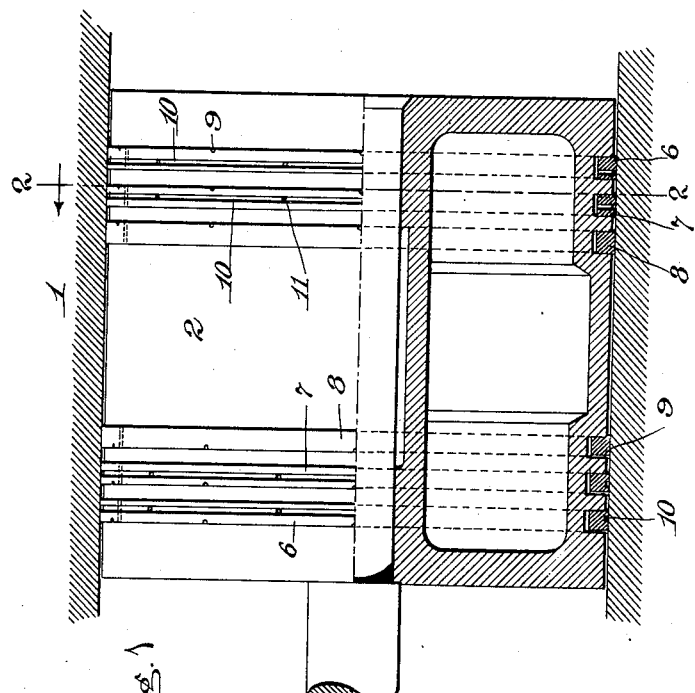
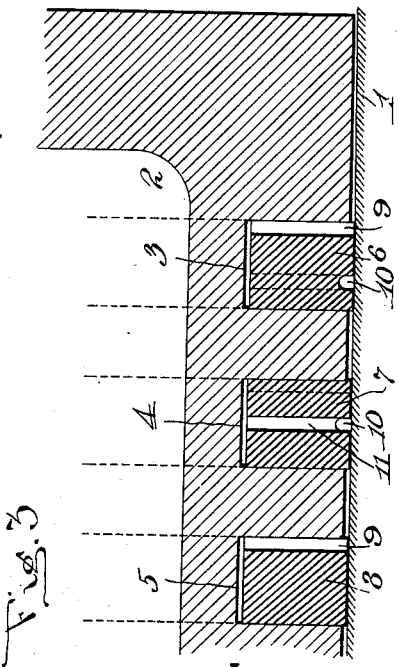
Witnesses:
Inventor
Edwin F. Williams
by Dyer Taylor
Attorneys.

UNITED STATES PATENT OFFICE.

EDWIN F. WILLIAMS, OF ERIE, PENNSYLVANIA; EVELYN WILLIAMS EXECUTRIX OF SAID EDWIN F. WILLIAMS, DECEASED.

PISTON-PACKING.

1,166,644.      Specification of Letters Patent.      Patented Jan. 4, 1916.

Application filed April 30, 1914. Serial No. 835,357.

*To all whom it may concern:*

Be it known that I, EDWIN F. WILLIAMS, a citizen of the United States, residing in Erie, county of Erie, State of Pennsylvania, have invented a certain new and useful Piston-Packing, of which the following is a specification.

This invention relates to improvements in packing means between pistons and cylinders in steam, gas or other elastic fluid engines, pumps, piston valves and the like.

The object of the invention is to prevent leakage and at the same time reduce wear to the greatest possible extent.

Further objects will more fully appear from the accompanying drawings and following specification, considered together or separately.

The invention applies more particularly to unaflow cylinders using steam at high pressure with superheat.

In the drawings, Figure 1 is a view partly in section of a piston and the walls of a cylinder for an engine, said piston showing three packing rings at each end; Fig. 2 is a sectional view taken on the line 2—2 of Fig. 1, looking in the direction of the arrow; Fig. 3 is a detail sectional view on an enlarged scale; and Fig. 4 is a similar view of a modification.

In all of the views, like parts are designated by the same reference characters.

The cylinder 1 and piston 2 are of the usual type. The engine may be unaflow or counterflow, without affecting the principles of the invention.

The particular embodiment chosen for illustration discloses two sets of rings, each set being three in number. In the periphery of the piston are a number of annular grooves best shown in Fig. 3, designated by the characters 3, 4 and 5. Three grooves are shown for illustration, but it is to be understood that the number may be varied as desired. Within the grooves 3, 4 and 5 are rings 6, 7 and 8. These rings may be of the ordinary snap or Ramsbottom type. They may be made of any material, but cast iron is ordinarily employed. The rings are split at one end and have elasticity enough to expand outward against the walls of the cylinder. In connection with each ring is a passage 9 extending from the outer to the inner face of the ring. This passage will admit fluid into the bases of the grooves 3, 4 and 5 and tend to force the rings outward. On the rings are annular recesses 10, 10. In connection with each annular recess is a radial port 11, see Fig. 3. Enough of these radial ports are employed to permit the fluid to freely flow from the space at the base of the groove into the annular recess 10. The annular recesses 10 are preferably made of a width sufficient to carry the pressure of the fluid, but are made as narrow as possible so that the wearing surface of the ring will not be materially reduced. The recess may be continuous or in sections, so long as there is at least one radial port to each section.

The operation is best observed from Fig. 3. The ring 6 is the one which is subjected to the highest pressure of fluid. This fluid would tend to leak through the joint between the ring and the wall of the cylinder and drive the lubricant before it out of the joint. The fluid, however, will pass through the passage 9 into the base of the groove 3 and through the port 11 into the annular recess 10, so that the pressure is substantially the same on both sides of that portion of the outer face of the ring which is between the anular recess and that edge of the ring subjected to the live pressure of the fluid. The effect of this is that the lubricant cannot be forced axially along the ring because it is acted upon by fluid in both directions. The hydrostatic pressure of the fluid on this part of the ring is inward to the same degree that the pressure of the fluid on the same surface of the ring on the inner side is outward. Hence, these parts are balanced. The fluid, however, may leak between the joint of the ring and cylinder from the annular recess to the other edge of the ring marked C in Fig. 4, but this fluid escaping will not exert any counterbalancing pressure on the ring and the ring will be forced outward by a pressure of fluid on the inside of the ring equal to the area marked C. A certain amount of fluid will leak by the first ring and enter the space under the second ring. In the second ring, however, the annular recess 10 is nearer the front edge of the ring than it is in the first ring, hence the area C on the second ring will be larger than the corresponding area on the first ring, so that there will be approximately as much pressure forcing the ring outward, with the lower presure of fluid, as is in the first one. The third ring 8 is not provided with an annular recess for the reason that, in the embodiment illustrated, it is assumed that the fluid which leaks past the second ring is of such reduced pressure that the ring 8 may be entirely unbalanced without being forced outward with so much force as to cause excessive wear.

In the modification shown in Fig. 4 the radial passage 9ª is shown in the wall of the ring groove instead of in the ring. The number of the passages 9 and radial ports 10 in each ring may be varied as desired. Also the number of rings on each piston may be increased or diminished from that shown.

Having described my invention, what I claim as new and desire to secure by Letters Patent, is:

1. The combination with a cylinder and piston, the latter having an annular groove in its periphery, of an expansion ring located within the groove, said ring having a single annular recess in its outer face, said recess being located at a point removed from that edge of the ring which is subjected to the pressure of fluid, said recess being narrow relatively to the width of the ring, so that the wearing surface thereof is not materially reduced, means for admitting fluid into the annular recess, whereby the pressure of the fluid on the outer face of the ring between the edge subjected to the pressure of fluid and the annular recess will be balanced, and means for admitting fluid into the piston groove under the ring to force the same outward.

2. The combination with a cylinder and piston, the latter having an annular groove in its periphery, of an expansion ring located within the groove, said ring having a single annular recess in its outer face, said recess being located at a point removed from that edge of the ring which is subjected to the pressure of fluid and nearer the other side of the ring, said recess being narrow relatively to the width of the ring so that the wearing surface thereof is not materially reduced, means for admitting fluid into the annular recess, whereby the pressure of fluid on the outer face of the ring between the edge subjected to the pressure of fluid and the annular recess will be balanced, and a port located at the joint between the piston groove and the ring for admitting fluid into the piston groove under the ring to force the same outward.

3. A piston ring having a single annular recess in its outer face located at a point removed from one edge of the ring, said annular recess being of narrow width compared with the width of the ring, so that the wearing surface of the ring is not materially reduced, a radial port connecting the annular recess with the underside of the ring, and a radial notch at one side of the ring extending from the outer to the inner face thereof.

4. In combination with a cylinder and piston, the latter having a plurality of annular grooves in its periphery, of an expansion ring located within each groove, at least two of said rings each having a single annular recess in its outer face, each recess being located at a point removed from that edge of the ring which is subjected to the pressure of fluid, said recess being of narrow width compared with the width of the ring so that the wearing surface thereof is not materially reduced, the recess in the ring subjected to the greater pressure being farther removed from that edge of the ring which is subjected to the pressure of fluid than is the recess in the other ring, means for admitting fluid into the annular recess in each ring whereby the pressure on the outer faces of the rings between each edge subjected to the pressure of fluid and the annular recess will be balanced, and means for admitting fluid into the piston grooves under the rings to force the same outward.

5. In combination with a cylinder and piston, the latter having at least two annular grooves in its periphery, an expansion ring located within each groove, that ring which is first subjected to the high pressure of fluid having a single annular recess in its outer face, said recess being located at a point removed from the edge of the ring which is subjected to the pressure of fluid, said recess being narrow relatively to the width of the ring so that the wearing surface thereof is not materially reduced, means for admitting fluid into the annular recess, whereby the pressure of the fluid on the outer face of the ring between the edge subjected to the pressure of fluid and the annular recess will be balanced, and radial notches for admitting fluid into the piston grooves under both of the rings to force the same outward.

6. The combination with a cylinder and piston, the latter having a plurality of annular grooves in its periphery, of an expansion ring located within each groove, each of said rings having an annular recess in its outer face, said recess being located at a point removed from that edge of the ring which is subjected to the pressure of fluid, means for admitting fluid into the annular recess whereby the pressure of the fluid on the outer face of the ring between the edge subjected to the pressure of fluid and the annular recess will be balanced, and means for admitting fluid into the piston groove under the ring to force the same outward, the annular recesses in the successive rings being progressively nearer that edge of the ring subjected to pressure.

7. The combination of a piston having an annular groove, a piston ring in said groove having a narrow annular recess in its outer face located nearer the side of the ring subjected to the low pressure, a series of substantially radial ports communicating with said groove and with the annular recess in the piston at the bottom of the ring, and a series of radial grooves substantially in the form of notches formed in the ring at the side subjected to the high pressure.

This specification signed and witnessed this 24th day of April, 1914.

EDWIN F. WILLIAMS.

Witnesses:
 CARL M. REED,
 CHAS. M. WARNER.